Jan. 31, 1956 R. RUHNAU 2,732,755
CINEMATOGRAPH FILM PROJECTORS
Filed April 21, 1952
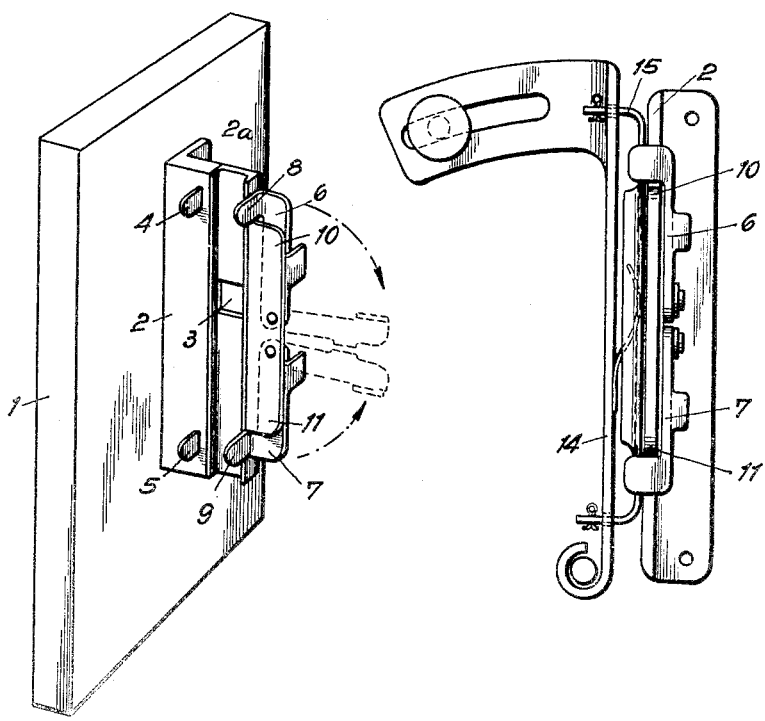

United States Patent Office 2,732,755
Patented Jan. 31, 1956

2,732,755

CINEMATOGRAPH FILM PROJECTORS

Richard Ruhnau, Berlin-Tempelhof, Germany

Application April 21, 1952, Serial No. 283,322

Claims priority, application Germany April 21, 1951

2 Claims. (Cl. 88—17)

This invention relates to cinematograph film projectors and especially to projectors for sub-standard film.

The insertion of films in the channel of the gate of a film projector occasions considerable difficulties more particularly in the case of sub-standard, for example, 8 mm. film, because the tendency of the film to curl easily results in the pressure plate, if of the type swinging away from the back plate for the insertion of film, clamping the film at an angle to its direction of movement in the film channel. It has therefore been proposed, for example in German patent specification No. 407,813, to maintain the pressure plate in position during insertion of the film and simply to insert it from the side. With this method of insertion however difficulties of a different kind occur. The guide elements which limit lateral movement of the film are a hindrance to insertion from the side so that the correct working position can only be obtained after repeated pulling of the film to and fro, which entails the possibility of injury to the film or loss of time.

It is a main object of the present invention to provide a gate that obviates the defects mentioned above.

It is another object of the invention to provide a gate having film-guiding elements on the side of the gate from which the film is inserted, which elements are movable to a position in which they are clear of the path of film being inserted.

It is yet another object of the invention to provide such elements capable on being moved to film-guiding position to urge laterally film incompletely inserted into the film channel into its correct working position.

It is a further object of the invention to provide locking means to retain the elements in film guiding position.

One embodiment of the invention will now be described by way of example with reference to the accompanying drawings in which:

Fig. 1 is a diagrammatic perspective view of a gate for a film projector, the pressure plate being omitted for sake of clarity.

Fig. 2 is a view in side elevation of the gate shown in Fig. 1, the pressure plate being shown in this figure.

Fig. 1 shows the gate 2 fitted on the body 1 of the projector and having a channel 2a constructed to be as flat as possible, with a film window aperture 3. Stationary lateral guide elements 4 and 5, which may comprise stop bars, adjustable pins or the like, afford the film lateral guidance on one side: arms 6 and 7, which can be swung out, are provided with flanges 8 and 9 which are bent out at right angles to the respective arms and effect the corresponding guiding on the other side. The arms can be swung about their pivot points to the position shown in dotted lines in Fig. 1. In this latter position of the arms the film can be conveniently inserted over the film supporting surface as far as the stops 4 and 5 without hindrance by projecting conponents. It is not necessary to put the film in a perfectly true running position. By swinging the arms 6 and 7 to their first mentioned position shown in full lines in Fig. 1, the film, which is under the pressure of the pressure plate (not shown) is urged laterally by the flanges 8, 9 and automatically pushed into the correct working position.

The arms 6 and 7 are mounted on the back plate of the gate 2 and their swinging movement is parallel to the film channel, while the surfaces for the lateral guidance of the film on the insertion side are formed by the flanges 8, 9 of the arms. The gate is provided with recesses 10 and 11 on the film insertion side which allow a free passage for the flanges 8 and 9. In order to avoid accidental displacement of the arms 6 and 7 when swung in, means to lock the arms 6 and 7 in their guiding position, consists in spring catches. When the projector is contained in a casing the arms 6 and 7 may be locked by the closing of the door, which then prevents a back movement of the swing arms.

As illustrated in Fig. 2 the carrier 14 of the elastically mounted pressure plate 15, the film-engaging edge of which has a gentle curvature, has a hinge and a securing arrangement, on unfastening which the pressure plate can be shifted sufficiently far from the gate 2 to enable the components which in the locked position form the film channel to be conveniently cleaned.

I claim:

1. In a film projector, a film gate comprising a stationary plate for guiding the film on one edge, two arms pivotally mounted on the rear side of the stationary plate and having rectangularly bent flanges for guiding the film on the other edge, said arms being swingable in a plane parallel to the film channel about their pivot points so that when said arms are in their inoperative position the film may be inserted laterally.

2. In a film projector, a film gate comprising a stationary plate, a counter plate spring pressed toward said stationary plate, guide elements fixed on said stationary plate for guiding the film on one edge, two arms pivotally mounted on the rear side of the stationary plate and having rectangularly bent flanges for guiding the film on the other edge, said arms being swingable parallel to the film channel about their pivot points so that when said arms are in their inoperative position the film may be inserted laterally, said arms having additional rectangularly bent flanges for manually operating said arms, the distance between the pivot points of said arms being so small that both arms may be brought to inoperative position by one hand.

References Cited in the file of this patent

UNITED STATES PATENTS

| | | |
|---|---|---|
| 1,298,600 | Taylor | Mar. 25, 1919 |
| 1,349,421 | Granz | Aug. 10, 1920 |
| 1,491,946 | Crocker | Apr. 29, 1924 |
| 1,888,527 | Edouart | Nov. 22, 1932 |
| 2,253,258 | Widmer | Aug. 19, 1941 |
| 2,461,471 | Jacobson | Feb. 8, 1949 |

FOREIGN PATENTS

| | | |
|---|---|---|
| 880,544 | France | Jan. 4, 1943 |
| 940,348 | France | May 18, 1948 |